(12) United States Patent
Manzanares et al.

(10) Patent No.: US 12,498,026 B1
(45) Date of Patent: Dec. 16, 2025

(54) INTEGRITY MONITORS FOR ACTUATOR BRAKES, AND RELATED SYSTEMS

(71) Applicant: Hummingbird Aero LLC, South Salt Lake, UT (US)

(72) Inventors: David Manzanares, Draper, UT (US); Nozar George Sadeghi, Irvine, CA (US); Douglas Bodily, Rexburg, ID (US)

(73) Assignee: Hummingbird Aero LLC, South Salt Lake, UT (US)

( * ) Notice: Subject to any disclaimer, the term of this patent is extended or adjusted under 35 U.S.C. 154(b) by 0 days.

(21) Appl. No.: 19/030,608

(22) Filed: Jan. 17, 2025

(51) Int. Cl.
| | |
|---|---|
| *B64C 13/28* | (2006.01) |
| *F16H 25/20* | (2006.01) |
| *F16H 25/22* | (2006.01) |
| *F16H 25/24* | (2006.01) |

(52) U.S. Cl.
CPC ......... *F16H 25/2454* (2013.01); *B64C 13/28* (2013.01); *F16H 25/2021* (2013.01); *F16H 25/2204* (2013.01)

(58) Field of Classification Search
CPC ..................................................... B64C 13/28
See application file for complete search history.

(56) References Cited

U.S. PATENT DOCUMENTS

| | | | |
|---|---|---|---|
| 5,582,390 A * | 12/1996 | Russ | ...................... B64C 13/28 244/99.2 |
| 6,109,415 A | 8/2000 | Morgan | |
| 7,293,524 B2 | 11/2007 | Darby | |
| 8,646,726 B2 * | 2/2014 | Manzanares | ........ F16H 25/2454 192/223.1 |
| 9,261,149 B2 | 2/2016 | Regan | |
| 9,482,335 B2 | 11/2016 | Regan | |
| 10,234,012 B1 * | 3/2019 | Latif | ................... F16H 25/2204 |
| 11,628,926 B2 | 4/2023 | Polcuch | |
| 11,873,092 B2 * | 1/2024 | Rozeboom | ............. B64D 45/00 |
| 2016/0297514 A1 * | 10/2016 | Turpin | ................ F16H 25/2454 |
| 2016/0369877 A1 | 12/2016 | Gitnes | |
| 2020/0324872 A1 | 10/2020 | Trenkle | |
| 2022/0185448 A1 * | 6/2022 | Rozeboom | ................ B64C 5/16 |

* cited by examiner

*Primary Examiner* — Justin M Benedik
(74) *Attorney, Agent, or Firm* — WORKMAN NYDEGGER

(57) ABSTRACT

Linear actuators can incorporate bi-directional brakes to inhibit back-driven actuator movements. An integrity monitor for such bi-directional brakes can include a manually adjustable, externally accessible load adjuster for applying a simulated back-driven load to the no-back brakes when the actuator is out of service. Associated components, apparatus and methods are described.

23 Claims, 8 Drawing Sheets

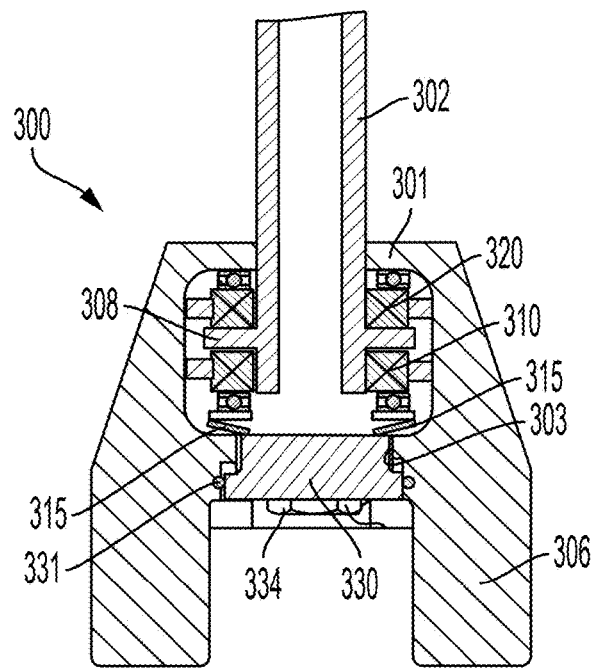
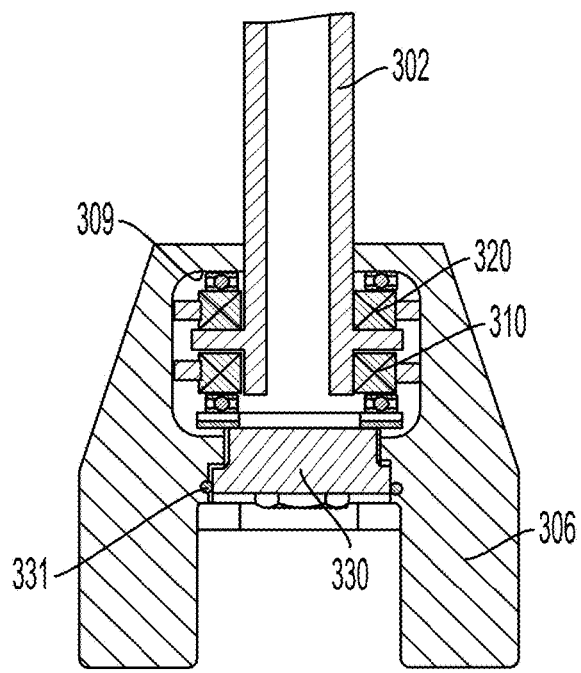
FIG. 5
FIG. 6
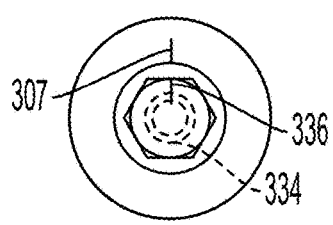
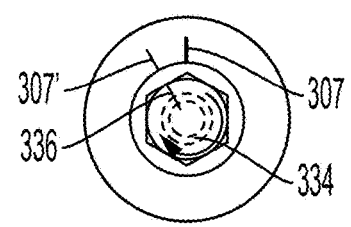
FIG. 5A
FIG. 6A ific and ancillary function to the vehicle. For example, some movable
INTEGRITY MONITORS FOR ACTUATOR BRAKES, AND RELATED SYSTEMS

FIELD

This application and the subject matter disclosed herein (collectively referred to as the "disclosure"), generally concern actuators for mechanical and electro-mechanical devices, and related systems and methods. More particularly, but not exclusively, this disclosure pertains to actuators for air vehicles, such as, for example, actuators for selectively positioning an air vehicle's flight-control surface.

BACKGROUND INFORMATION

Some vehicles incorporate one or more adjustable or otherwise movable components that provide critical or ancillary function to the vehicle. For example, some movable components allow operators to selectively reconfigure a vehicle by moving a component into a position that alters the net forces acting on the vehicle. Control surfaces of air or water vehicles provide convenient examples of such movable components. By adjusting position of a control surface, the operator can steer the vehicle or adjust its attitude as the vehicle moves through air or water, or over land. Movable wings, reorientable engines and thrust mechanisms, and openable and closeable bay doors are but several other examples of movable components that operators can selectively configure to facilitate different phases of vehicle operation.

Linear actuators, and more particularly but not exclusively, ball-screws threadedly engaged with a ball-nut, are commonly used to selectively position vehicle components, e.g., relative to a vehicle frame or chassis. Control surfaces for air vehicles provide but one of many suitable examples of such selectively repositionable vehicle components, with a moveable horizontal stabilizer being just one of many possible examples of selectively repositionable control surfaces. A repositionable vehicle component can undergo translation or rotation, or both when acted upon by a linear actuator.

For example, a moveable horizontal stabilizer can define a chassis-engagement region and an actuator-engageable region. In context of an actuator having a ball-screw and a ball-nut, one of the ball-screw and the ball-nut can be mounted to the vehicle chassis and the other of the ball-screw and the ball-nut can be mounted to the actuator-engageable region of the stabilizer. The ball-screw or the ball-nut, or both, can be driven in rotation about a longitudinal axis, e.g., defined by the ball-screw. Such rotation tends to urge the ball-screw and the ball-nut to translate relative to the other. For example, either or both of the ball-screw and the ball-nut can translate relative to a fixed frame-of-reference. Such translation, in turn, can urge relative movement between the actuator-engageable region of the trim surface and the vehicle chassis. Movement of the actuator-engageable region of the trim surface relative to the vehicle chassis can cause the trimmable horizontal stabilizer to move proportionately according to the configuration of the chassis-engagement region and the extent of movement of the actuator-engageable region relative to the vehicle chassis.

Generally, as a vehicle component traverses its range of motion from one extreme to another, forces acting on the component can change in magnitude and direction. A horizontal stabilizer, for example, can be selectively repositionable in a manner similar to the trim surface example described above. Forces acting on the horizontal stabilizer when it is hard-over in one direction can be approximately equal to, but opposite in direction to, forces acting on the horizontal stabilizer when it is hard-over in an opposite direction.

Such forces, regardless of direction, can back feed through a component on which they act (e.g., a horizontal stabilizer) to the underlying mechanisms that support and urge the component to change position. Left unchecked, such back-fed forces can cause the component's actuator to move, and with it, the component.

Returning to the trimmable horizontal stabilizer example described above, aerodynamic forces on the trimmable horizontal stabilizer back-fed to the linear actuator can, if left unchecked, cause the rotatable one (or ones) of the ball-screw and ball-nut to rotate and thus cause relative movement therebetween. As described above, relative movement between the ball-screw and the ball-nut can cause the exposed control surface to move, not selectively (e.g., by a pilot) but unintentionally due to the back-fed aerodynamic forces arising from operation of the air vehicle and the trim surface's intentionally selected position. Unintentional movement of a vehicle component, e.g., a trimmable horizontal stabilizer or an elevator, in turn, can lead to unpredictable or undesirable effects on the vehicle's operation. For example, unintentional movement of trimmable horizontal stabilizer can unintentionally change the attitude of the air vehicle, leading to degraded flight performance or, in a worst-case scenario, catastrophic loss of the air vehicle.

Various braking mechanisms have been employed to prevent unintentional movement of linear actuators due to back-fed forces, regardless of their source. Such braking mechanisms are sometimes referred to in the art as a "no-back brake."

U.S. Pat. No. 6,109,415, issued Aug. 29, 2000, described a ball-screw having a flange that urges against a lower skewed-roller brake disc when the ball-screw is pressed downward in compression. The flange urges against an upper skewed-roller brake disc when tension applied to the ball-screw lifts the ball-screw flange. The '415 patent also described ratchet wheels that control the direction of braking force application based on whether the ball-screw is under tension or compression.

U.S. Pat. No. 8,646,726, issued Feb. 11, 2014, described an embodiment of an aircraft having a movable control surface engaged with a linear actuator. Additionally, the '726 Patent described a no-back device configured to resist movement of a ball screw in the direction of an aiding load exerted on the ball screw, e.g., by an intermediately-pivoted airfoil surface. The no-back device in the '726 Patent includes a spring that applies a continuous pre-load force to a braking mechanism. The continuous pre-load force applied to the braking mechanism requires application of a threshold torque to the ball screw to move the ball screw even when the ball screw lacks an external load. According to the '726 Patent, operational integrity of the no-back device can be checked by comparing an actual torque required to turn the ball screw to the threshold torque.

SUMMARY

Some disclosed actuators incorporate a no-back brake, as well as an integrity monitor for assessing performance of the no-back brake. Some disclosed integrity monitors permit technicians or other users to assess a measure of a no-back brake's performance while the actuator is unloaded by or otherwise free of any back-fed loads, e.g., while a vehicle remains at rest. For example, a no-back brake can be configured to impart torsional drag to a rotatable component when a longitudinal load is applied to the no-back brake. An integrity monitor for such a no-back brake can incorporate a longitudinally movable load adjuster that selectively activates the no-back brake by simulating an external load and allowing its operation to be assessed as when under an external load. In other respects, air vehicles are disclosed that incorporate a rotatable actuator member and a brake configured to inhibit rotation of the rotatable actuator member. Disclosed air vehicles also include an integrity monitor configured to allow ground crew members and other technicians to manually engage the no-back brake when the air vehicle is at rest to simulate its operation when the air vehicle is under way. Once the no-back brake is manually engaged, torsional drag imparted by the no-back brake can be observed, allowing assessment of the no-back brake's integrity before the air vehicle returns to flight service.

For example, according to an aspect of this disclosure, a linear actuator includes a shaft and a nut. The shaft defines a longitudinal axis and a first threaded portion. The nut defines a second threaded portion. The first threaded portion and the second threaded portion are so complementary with each other as to be threadedly engageable with each other. When the shaft and the nut are threadedly engaged with each other, rotation of the shaft or the nut imparts translative movement of the shaft and the nut relative to each other along the longitudinal axis. The linear actuator also includes a no-back brake. The no-back brake has a friction interface configured to impart a selected torsional drag counter to said rotation of the shaft or the nut when a threshold longitudinal load is applied to the friction interface by the shaft or the nut, or both. Further, the linear actuator includes a movable load adjuster configured to selectively apply a longitudinal load to the friction interface. The longitudinal load applied by the movable load adjuster simulates the threshold longitudinal load applied to the friction interface by the shaft or the nut, or both.

Some linear actuator embodiments include a chassis configured to longitudinally retain the shaft or the nut. The longitudinally-retained one of the shaft and the nut can be configured to rotate, and said rotation urges the other of the shaft and the nut to translate along the longitudinal axis relative to the chassis.

In some linear actuator embodiments, the friction interface includes a friction disc, a skewed-roller brake disc, or both, configured to impart the torsional drag counter to said rotation.

In some linear actuator embodiments, the longitudinally movable load adjuster includes a longitudinally movable thrust nut and a deflectable spring. The deflectable spring can have a service configuration and a loaded configuration. In the loaded configuration, the deflectable spring can engage the friction interface to impart torsional drag counter to said rotation. In some linear actuator embodiments, the thrust nut is longitudinally movable from a first longitudinal position to a second longitudinal position. Movement of the thrust nut from the first longitudinal position to the second longitudinal position can urge the deflectable spring to deform from its service configuration to its loaded configuration. The friction interface can include a friction element. In the loaded configuration, the deflectable spring can engage the friction element. In some embodiments, the engaged friction element imparts said torsional drag to the shaft or to the nut, or to both.

Movement of the thrust nut from the second longitudinal position to the first longitudinal position can allow the deflectable spring to resiliently recover its service configuration from its loaded configuration. In its service configuration, the deflectable spring can impart less than the threshold longitudinal load to the friction interface.

In some actuator embodiments, the threshold longitudinal load is a threshold compressive load applied to the shaft. The torsional drag counter to said rotation can be a torsional drag counter to rotation in a first direction. The no-back brake can be configured to reduce or to release the torsional drag counter to rotation in the first direction when a threshold tensile load is applied to the shaft.

The friction interface can be a first friction interface configured to impart a first torsional drag counter to said rotation in a first direction when a threshold longitudinal load is applied to the shaft or the nut, or both, in a first longitudinal direction. Some linear actuator embodiments also include a second friction interface configured to impart a second torsional drag counter to rotation in a second direction opposite the first direction. For example, the second torsional drag can arise when a threshold longitudinal load is applied to the shaft or the nut, or both, in a second longitudinal direction opposite the first longitudinal direction.

The first friction interface can be configured to impart the first torsional drag counter to rotation in the first direction when a threshold compressive load is applied to the shaft. The second friction interface can be configured to impart the second torsional drag counter to rotation in the second direction when a threshold tensile load is applied to the shaft.

The longitudinally movable load adjuster can be configured to engage the first friction interface to impart the first torsional drag, to engage the second friction interface to impart the second torsional drag, or both.

According to another aspect, vehicles are disclosed. For example, a vehicle includes a chassis and a vehicle component movably coupled with the chassis. The vehicle also includes a rotatable actuator member defining a longitudinal axis. The rotatable actuator member is so coupled with the chassis and the vehicle component that the vehicle component moves relative to the chassis in correspondence with rotation of the rotatable actuator member. A brake is configured to inhibit the rotatable actuator member from rotating under forces back-fed to the rotatable actuator through the vehicle component during operation of the vehicle. An integrity monitor for the brake has a movable threaded member. The movable threaded member is configured to selectively apply a threshold load to the brake in correspondence with movement of the threaded member along the longitudinal axis. The threshold load engages the brake to inhibit the rotatable actuator member from rotating.

Some vehicle embodiments include a linear actuator comprising a ball-screw and a ball-nut. In such vehicle embodiments, the rotatable actuator member is the ball-screw of the linear actuator.

The brake can include a friction interface configured to impart a torsional drag to the ball screw when forces applied by the vehicle component during operation of the vehicle urge the ball screw in compression or tension, or both.

In some embodiments, the friction interface is a first friction interface configured to impart a torsional drag to the ball screw when forces applied by the vehicle component during operation of the vehicle urge the ball screw in compression. In some embodiments, the brake also has a second friction interface configured to impart a second torsional drag to the ball screw when forces applied by the vehicle component during operation of the vehicle urge the ball screw in tension.

The threaded member can be configured to selectively apply the threshold load to the first friction interface, the second friction interface, or both.

The movable threaded member can be manually adjustable.

The integrity monitor can include a resiliently compressible spring that, when compressed to a threshold measure, applies the threshold load to the brake. The movable threaded member can be configured to compress the resiliently compressible spring to the threshold measure.

According to other aspects, methods for checking integrity of a no-back brake for a flight-control actuator are disclosed. The flight-control actuator has a rotatable member defining a longitudinal axis and the no-back brake applies torsional drag to counter rotation of the rotatable member when a force is applied to the rotatable member along the longitudinal axis. According to such methods, a longitudinally directed threshold force is applied to the no-back brake with an adjustable integrity monitor. A selected threshold torque is applied to the rotatable member. And, a condition of the no-back brake is determined in correspondence with whether the rotatable member rotates under the selected threshold torque.

The act of applying a selected threshold torque to the rotatable member can include urging an input shaft in rotation. The input shaft and the rotatable member can be so coupled with each other through a gearing that a torque applied to the input shaft applies an increased torque to the rotatable member of the flight-control actuator.

The act of determining a condition of the no-back brake in correspondence with whether the rotatable member rotates under the selected threshold torque can include determining that the no-back brake requires service before returning to flight service when the rotatable member rotates under the selected threshold torque. The act of determining a condition of the no-back brake in correspondence with whether the rotatable member rotates under the selected threshold torque can additionally or alternatively include determining that the no-back brake does not require service before returning to flight service when the rotatable member remains stationary under the selected threshold torque.

The act of applying the selected torque to the rotatable member can include activating an electric motor configured to urge the rotatable member into rotation. The electric motor can have a drive shaft coupled with the rotatable member through one or more mated gears.

The no-back brake can be a compression no-back brake configured to apply a torsional drag to the rotatable member when the rotatable member is under at least a threshold compressive load.

The rotatable member can be a ball-screw. The adjustable integrity monitor can be a longitudinally movable member configured to urge the compression no-back brake into frictional engagement with the rotatable member when the longitudinally movable member moves from a first, inflight-service position to a second, maintenance position.

The no-back brake can be a tension no-back brake configured to apply a torsional drag to the rotatable member when the rotatable member is under at least a threshold tensile load.

The rotatable member can be a ball-screw. The adjustable integrity monitor can be a longitudinally movable member configured to urge the tension no-back brake into frictional engagement with the rotatable member when the longitudinally movable member moves from a first, inflight-service position to a second, maintenance position.

The adjustable integrity monitor can be manually adjustable from an in-flight service position to a maintenance position with a hand tool.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

FIG. 5 schematically illustrates a cross-sectional view of a linear actuator having a no-back brake and a load adjuster.

FIG. 5A shows an end-elevation view of the load adjuster oriented as in FIG. 5.

FIG. 6 schematically illustrates a cross-sectional view of the linear actuator shown in FIG. 5 with the load adjuster applying a compressive load to the no-back brake.

FIG. 6A shows an end-elevation view of the load adjuster oriented as in FIG. 6.

DETAILED DESCRIPTION

Figure 1:
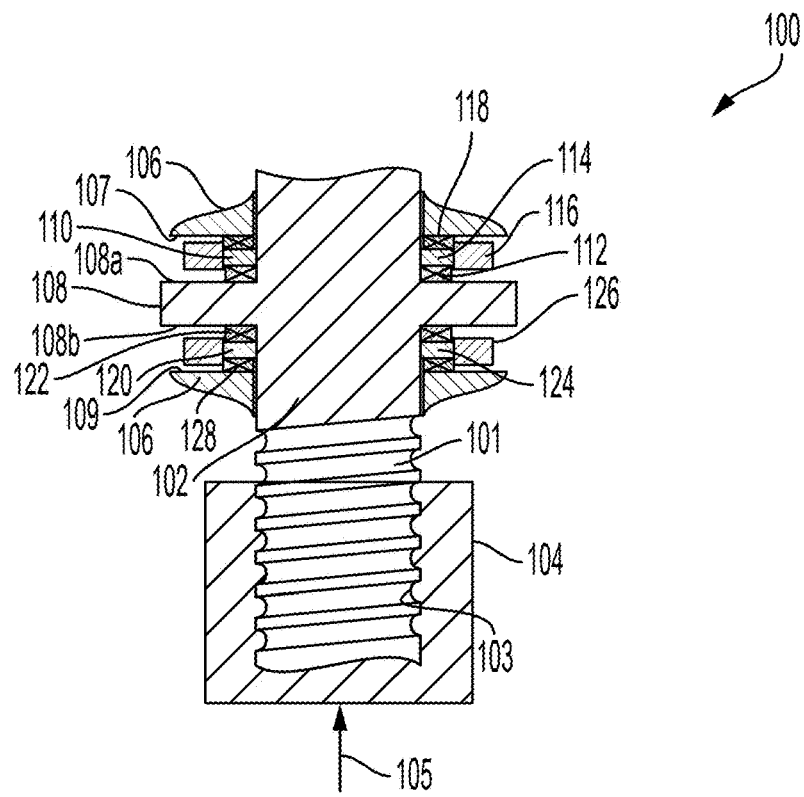
FIG. 1 schematically illustrates a portion of a linear actuator having a compression no-back brake and a tension no-back brake.

The following describes various principles related to mechanical and electro-mechanical actuators, and more particularly, but not exclusively, to flight-control actuators configured to allow technicians to assess their functional integrity. For example, certain aspects of disclosed principles pertain to no-back brakes for flight-control actuators, as well as mechanisms configured to manually engage the no-back brakes with a simulated flight load typical during inflight operation of an air-vehicle. Applying a simulated inflight load to a no-back brake can allow a technician to assess integrity of the no-back brake while the air-vehicle remains at-rest, e.g., on the ground between flights. That said, descriptions herein of specific apparatus configurations and combinations of method acts are but particular examples of contemplated systems chosen as being convenient to explain disclosed principles. One or more of the disclosed principles can be incorporated in various other systems to achieve any of a variety of corresponding system characteristics.

Thus, systems having attributes that are different from those specific examples discussed herein can embody one or more presently disclosed principles, and can be used in applications not described herein in detail, without departing from the scope and intent of this disclosure.

I. Overview

Prior linear actuators, generally, and ball-screw actuators in particular, are susceptible to being back-driven by external loads applied to an actuatable component during use. For example, inflight, aerodynamic loading of flight-control surfaces has been known to back-drive some prior linear actuators, which in turn allows the flight-control surface to move from its intended position or orientation. No-back brakes ameliorate such unintended movement by introducing frictional drag to the actuation mechanism. Such drag can be significant enough to inhibit movement of the flight-control surface under typical aerodynamic loading and yet low enough to be overcome by a drive unit, e.g., an electric motor or a hydraulic actuator. The magnitude of the drag can correspond, in some actuator embodiments, to the magnitude of aerodynamic loading on a flight-control surface.

Some disclosed actuators incorporate a load adjuster configured to simulate an actuator load arising from aerodynamic loading of a flight-control surface. For example, such a load adjuster can be configured to selectively apply a threshold load to a friction interface of a no-back brake when an air-vehicle is at rest. The threshold load can correspond to a selected flight condition of the air-vehicle, allowing the integrity of the no-back brake to be assessed while the air-vehicle remains at-rest by observing the force necessary to overcome the frictional drag of the no-back brake. If the force necessary to overcome the frictional drag of the no-back brake falls below a threshold drag force when the load adjuster applies its threshold load to the friction interface, an integrity of the no-back brake may be compromised.)

Further details of disclosed principles are set forth below.

II. Actuators with No-Back Brakes

Referring now to FIG. 1, a representative linear actuator 100, as for positioning a movable vehicle component, e.g., a control surface, will be described. The illustrated linear actuator 100 has a shaft 102 defining a longitudinal axis and a first threaded portion 101. A nut 104 defines a second threaded portion 103 complementary with the first threaded portion 101, allowing the nut 104 and the shaft 102 to threadedly engage with each other. With such an arrangement, rotation of the shaft or the nut imparts translative movement of the shaft and the nut relative to each other along the longitudinal axis.

In FIG. 1, the shaft 102 is pivotably mounted to a chassis 106 to allow the shaft to rotate about its longitudinal axis while having limited or no longitudinal movement (apart from load-induced deformations, e.g., mechanical strain, of the shaft, nut and chassis). In FIG. 1, the nut 104 is allowed to translate longitudinally along the shaft but is otherwise mounted to inhibit or altogether prevent rotation of the nut about the longitudinal axis. As the shaft 102 rotates about its longitudinal axis, the nut 104 translates longitudinally along the first threaded portion 101, which can induce motion to a movable vehicle component coupled with the nut.

The actuator 100 shown in FIG. 1 also has a compression no-back brake 110 and a tension no-back brake 120. The compression no-back brake 110 is configured to induce torsional drag to the pivotable engagement between the chassis 106 and the shaft 102 when the shaft is under a compressive load as indicated by the arrow 105 shown in FIG. 1. Similarly, the tension no-back brake 120 is configured to induce torsional drag to the pivotable engagement between the chassis 106 and the shaft 106 when the shaft is under a tensile load, e.g., in a direction opposite to the direction indicated by the arrow 105 shown in FIG. 1.

Figure 11:
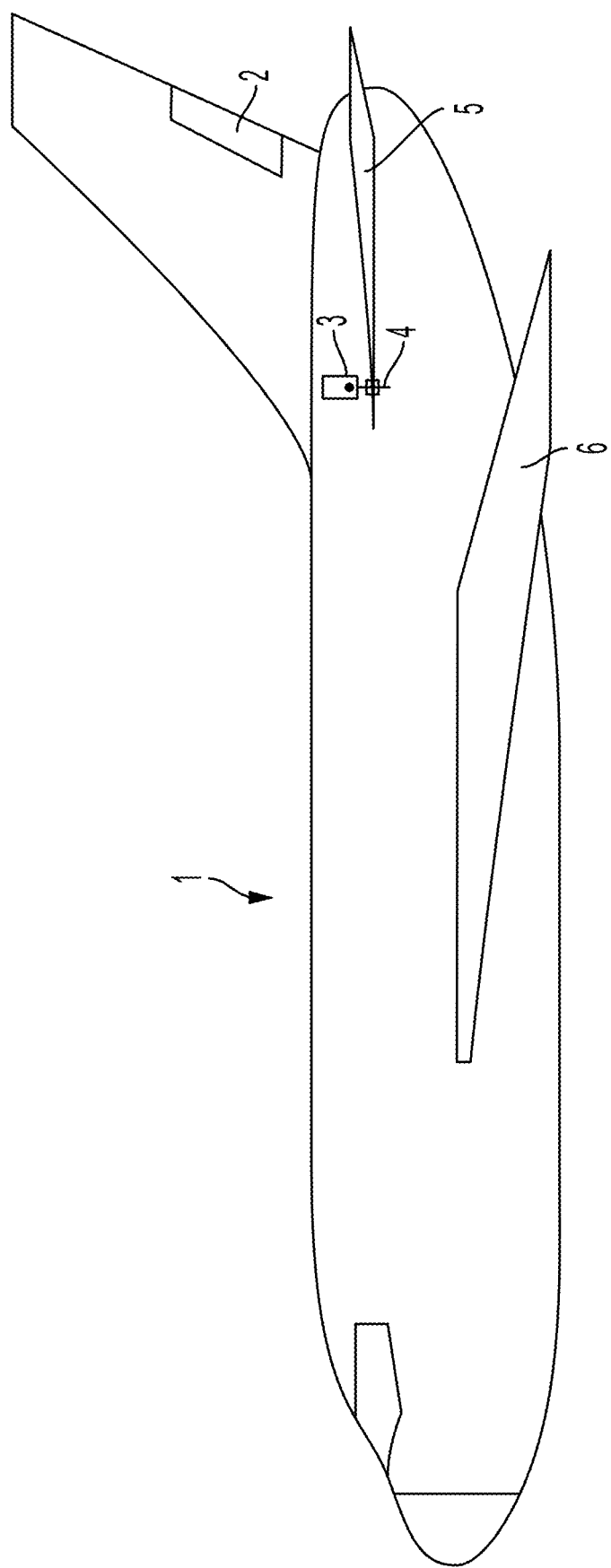
FIG. 11 schematically illustrates an air vehicle that incorporates a linear actuator as disclosed herein for controlling position of a flight-control surface.

Referring briefly to FIG. 11, which shows an air vehicle, e.g., an aircraft 1, having a plurality of flight-control surfaces, e.g., rudder 2, horizontal stabilizer 5 (which itself may be trimmable), and elevator 6. In FIG. 11, an actuator as described herein is shown at actuator 3 and a linkage 4 couples the horizontal stabilizer 5 with a movable component of the actuator 3, e.g., a movable nut 104. Although the actuator 3 is shown as being coupled with the horizontal stabilizer 5, actuators disclosed herein can be coupled with any movable vehicle component.

Referring again to FIG. 1, the nut 104 can apply such compressive and tensile loads to the shaft 102 according to external loads applied to a movable vehicle component, e.g., aerodynamic loads on a flight-control surface (e.g., horizontal stabilizer 5) for an air vehicle, e.g., aircraft 1. For example, a horizontal stabilizer 5 oriented in one direction relative to a neutral position can apply (via a connection with the nut 104, e.g., provided by linkage 4) a tensile load to the shaft 102 and the horizontal stabilizer 5 oriented in an opposite direction relative to the neutral position can apply (via the connection with the nut 104, e.g., provided by linkage 4) a compressive load to the shaft. In either case, the absence of a no-back brake could allow the horizontal stabilizer 5, via the connection with the nut 104, to cause the shaft 102 to rotate, inducing unintended motion to the actuator, when the back-fed aerodynamic forces applied to the nut exceed internal actuator forces that resist motion (e.g., friction within the actuator mechanisms, magnetic forces internal to an electric drive motor, hydraulic forces for hydraulically driven actuators). Such actuator motion, in turn, could allow the horizontal stabilizer 5 to move (unintentionally) from an intended position as the nut 104 traverses longitudinally along the rotating shaft 102. The compression no-back brake 110 induces torsional drag to counter rotation of the shaft when the horizontal stabilizer 5 or other control surface, via its connection with the nut 104, places the shaft 102 in compression. Similarly, the tension no-back brake 120 induces torsional drag to counter rotation of the shaft when the horizontal stabilizer 5 or other control surface, via its connection with the nut 104, places the shaft 102 in tension.

As an orientation of a control surface (e.g., the horizontal stabilizer in the example above) approaches an upper threshold orientation in either direction (e.g., a "hard-over" orientation in either direction), aerodynamic forces applied to the control surface tend to increase to an upper threshold load. A magnitude of the torsional drag imparted by each no-back brake 110, 120 can be selected to be sufficiently high to prevent or inhibit movement of the actuator under such aerodynamic loading on the control surface, while being sufficiently low that a motor (not shown) coupled with the shaft 102 can overcome the torsional drag and the aerodynamic loading when a desired motion of the actuator urges movement in opposition to the back-fed load from the aerodynamic loading. For example, each no-back brake 110, 120 can have a friction interface configured to impart a corresponding torsional drag in correspondence with a threshold longitudinal load applied to the friction interface by the shaft.

As noted above, and referring still to FIG. 1, the shaft 102 can be pivotably mounted with the chassis 106. More particularly, the shaft 102 can incorporate a flange 108 positioned between opposed thrust-faces 107, 109 of the chassis that inhibit substantial longitudinal (or axial) movement of the actuator shaft 102. Positioned between the flange 108 and the distal (relative to the nut 104) thrust face 107 is the compression no-back brake 110. The illustrated compression no-back brake 110 includes a friction interface that imparts torsional drag counter to rotation of the shaft in a "compression aiding direction," i.e., the direction in which the shaft is urged to rotate when the nut 104 urges the shaft in compression, e.g., toward the distal thrust face 107 of the chassis 106.

In the embodiment shown in FIG. 1, the friction interface includes the distal face 108a of the flange 108, a first skewed-roller brake disc 112, and a compression ratchet plate 114. The compression ratchet plate 114, which in the illustrated embodiment is annular in shape, defines a plurality of recesses 113 from its outermost circumference that can matingly receive a pawl 116 pivotably mounted to the chassis 106. With such an arrangement, the compression ratchet plate 114 is substantially free to rotate in a direction opposite to the compression aiding direction as the pawl drags along the outer circumference of the compression ratchet plate. As FIG. 1 shows, a compression thrust bearing 118 can be positioned between the distal thrust face 107 of the chassis 106 and the distal face of the compression ratchet plate 114 (e.g., analogous to the distal face 214a shown in FIG. 4) to ensure the compression ratchet plate can rotate in the direction opposite to the compression aiding direction (e.g., clockwise in FIG. 2) with low torsional friction.

Figure 2:
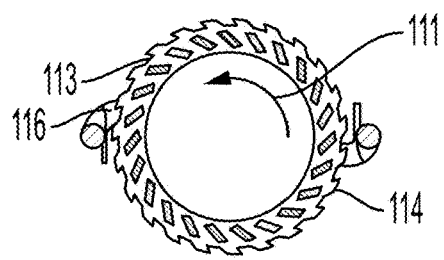
FIG. 2 schematically illustrates a portion of the compression no-back brake shown in FIG. 1.

However, as FIG. 2 shows, when the compression ratchet plate 114 tends to rotate in the compression aiding direction (indicated by arrow 111; e.g., counterclockwise in FIG. 2), the pawl 116 catches in a recess 113 and engages the outer circumference of the compression ratchet plate 114. As the pawl 116 engages the outer circumference of the compression ratchet plate 114, the pawl prevents the compression ratchet plate 114 from rotating in the compression aiding direction (e.g., counterclockwise in FIG. 2). With the compression ratchet plate 114 being stationary when the shaft 102 is urged longitudinally in compression and to rotate in the compression aiding direction, the first skewed-roller brake disc 112 inhibits rotation by virtue of the skewed rollers within the brake disc 112 (analogous to skewed-roller brake disc 212 in FIG. 4, below). That is to say, although the skewed rollers are free to rotate within the brake disc 112, the rollers are mounted such that their longitudinal axes are skewed, i.e., not oriented radially. Thus, as the flange 108 urges in rotation about the shaft's longitudinal axis, the rollers impart torsional drag to the flange in correspondence to a skew angle of rollers and a coefficient of friction between the rollers and the flange. That is to say, the flange 108 must slide along the skewed rollers for the shaft 102 to rotate.

Such friction between the distal face 108a of the flange 108 and the first skewed-roller brake disc 112 (or a first friction plate) induces torsional drag to the flange, and thus the shaft 102. Such torsional drag can prevent or inhibit rotation of the shaft 102 under compressive loading by the nut 104 that is typical of loads applied to the nut by aerodynamic loading on a control surface, thus allowing the actuator to maintain a selected orientation of the control surface. Nevertheless, such torsional drag can be sufficiently low that a motor (not shown) coupled with the shaft 102 can overcome the torsional drag imparted by the no-back assembly to rotate the shaft in the compression aiding direction. Such rotation in the compression aiding direction can allow the actuator to selectively reposition the control surface to another desired orientation.

Referring again to FIG. 1, positioned between the flange 108 and the proximal (relative to the nut 104) thrust face 109 is the tension no-back brake 120. The illustrated tension no-back brake 120 includes a friction interface that imparts torsional drag counter to rotation of the shaft in a "tension aiding direction," i.e., the direction in which the shaft is urged to rotate when the nut 104 urges the shaft in tension, e.g., in a direction that urges the flange 108 toward the proximal thrust face 109 of the chassis 106, which in FIG. 1 is in a direction opposite to the compression aiding direction.

Figure 3:
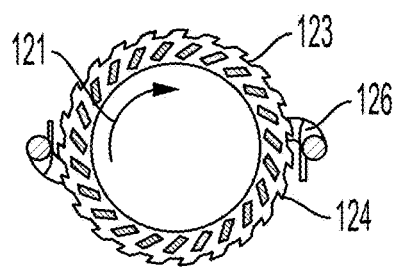
FIG. 3 schematically illustrates a portion of the tension no-back brake shown in FIG. 1.

In the embodiment shown in FIG. 1, the friction interface for the tension no-back brake includes the proximal face 108b of the flange 108, a second skewed-roller brake disc 122 and a tension ratchet plate 124 The tension ratchet plate 124, which in the illustrated embodiment shown in FIG. 3 is annular in shape, defines a plurality of recesses 123 from its outermost circumference that can matingly receive a pawl 126 pivotably mounted to the chassis 106. With such an arrangement, the tension ratchet plate 124 is substantially free to rotate in a direction opposite to the tension aiding direction as the pawl drags along the outer circumference of the tension ratchet plate. As FIG. 1 shows, a tension thrust bearing 128 can be positioned between the proximal thrust face 109 of the chassis 106 and the proximal face 108b (FIG. 10) of the tension ratchet plate 124 to ensure the tension ratchet plate can rotate in the direction opposite to the tension aiding direction when the shaft 102 is in tension (e.g., counterclockwise in FIG. 1) with low torsional friction.

However, as FIG. 1 shows, when the tension ratchet plate 124 tends to rotate in the tension aiding direction (indicated by arrow 121; e.g., clockwise in FIG. 3), the pawl 126 catches in a recess 123 and engages the outer circumference of the tension ratchet plate 124. As the pawl 126 engages the outer circumference of the tension ratchet plate 124, the pawl prevents the tension ratchet plate from rotating in the tension aiding direction (e.g., clockwise in FIG. 3). With the tension ratchet plate 124 being stationary when the shaft 102 is urged longitudinally in tension and to rotate in the tension aiding direction, friction between the proximal face 108b of the flange and the second skewed-roller brake disc 122 (or a second friction plate) induces torsional drag to the flange 108, and thus the shaft 108. That is to say, although the skewed rollers are free to rotate within the brake disc 122 (analogous to skewed-roller brake disc 222 in FIG. 4, below), the rollers are mounted such that their longitudinal axes are skewed, i.e., not oriented radially. Thus, as the flange 108 urges in rotation about the shaft's longitudinal axis, the rollers impart torsional drag to the flange in correspondence to a skew angle of rollers and a coefficient of friction between the rollers and the flange. That is to say, the flange 108 must slide along the skewed rollers for the shaft 102 to rotate.

Such friction between the proximal face 108b of the flange 108 and the second skewed-roller brake disc 122 (or a second friction plate) induces torsional drag to the flange 108, and thus the shaft 102. Such torsional drag can prevent or inhibit rotation of the shaft 102 under tensile loading by the nut 104 that is typical of loads applied to the nut by aerodynamic loading on a control surface, thus allowing the actuator to maintain a selected orientation of the control surface. Nevertheless, such torsional drag can be sufficiently low that a motor (not shown) coupled with the shaft 102 can overcome the torsional drag imparted by the no-back assembly to rotate the shaft in the tension aiding direction. Such rotation in the tension aiding direction can allow the actuator to selectively reposition the control surface to another desired orientation.

Although skewed-roller brake discs are described above as being positioned between, and imparting friction between, the flange 108 and the ratchet plates 114, 124, other brake-disk configurations are possible. For example, a friction plate similar to a clutch plate or other wearable friction plate can be substituted in some embodiments for the skewed-roller brake disc.

Figure 4:
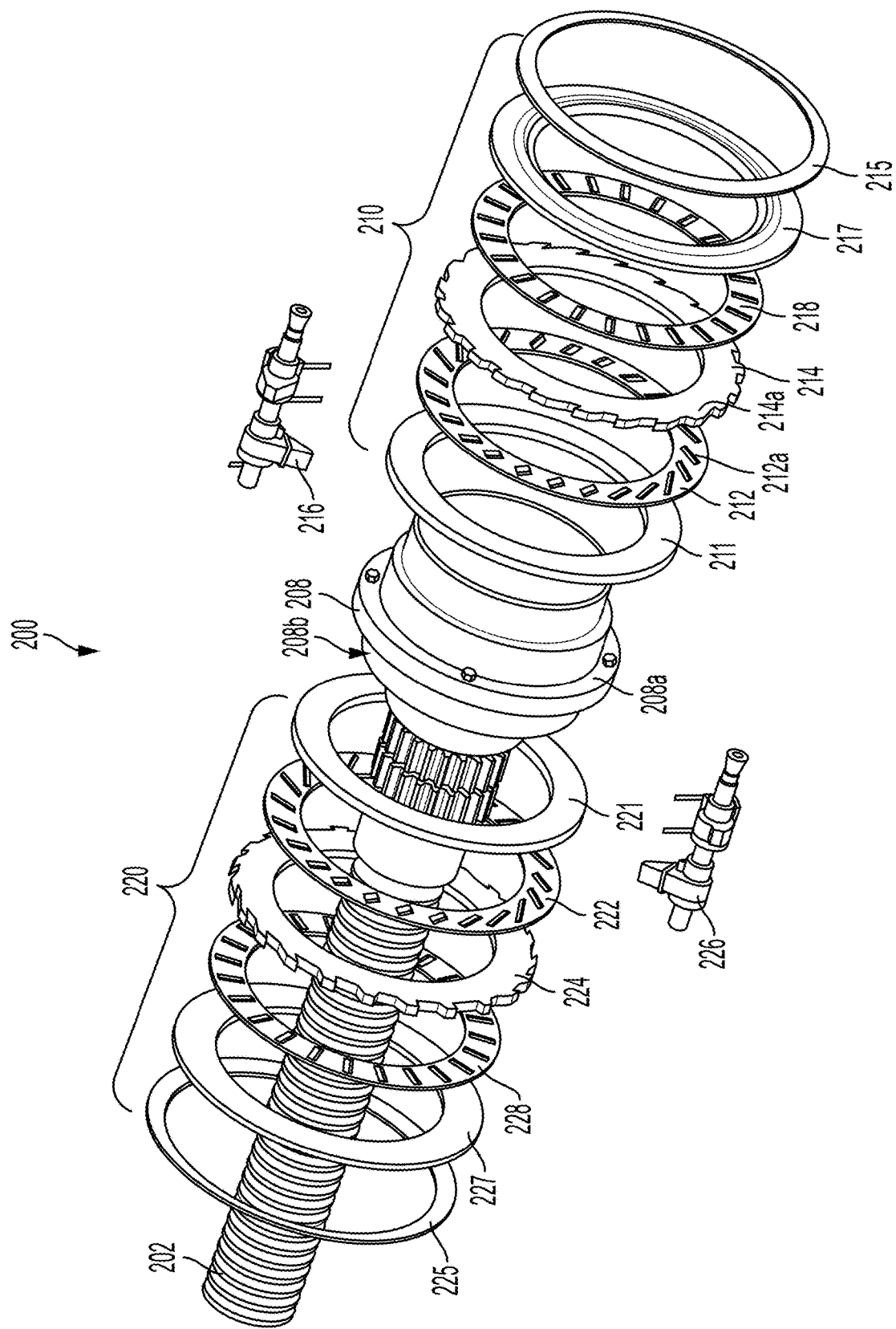
FIG. 4 shows an exploded view of a portion of a linear actuator analogous to the portion of the linear actuator shown in FIG. 1.

FIG. 4 shows an exploded view of a portion of an actuator 200, similar to the actuator 100 shown in FIG. 1, having bi-directional no-back brakes 210, 220. Like the actuator 100 in FIG. 1, the actuator 200 shown in FIG. 4 has a rotatable ball-screw 202, a movable ball-nut (not shown in FIG. 4 but analogous to the ball-nut 104 shown in FIG. 1), and a flange 208, as well as a compression no-back brake 210 and a tension no-back brake 220. Like the compression no-back brake 110 in FIG. 1, the compression no-back brake 210 is configured to impart torsional drag to the flange 208 counter to rotation of the ball-screw 202 in a compression aiding direction, e.g., when the shaft of the ball-screw is under compressive loading from the ball-nut. Similarly, the tension no-back brake 220 in FIG. 2 imparts torsional drag counter to rotation of the ball-screw 202 when the shaft of the ball-screw is under tensile loading from the ball-nut.

The no-back brakes 210, 220 shown in FIG. 4 include analogous components to those discussed above in connection with the actuator 100. For example, the compression no-back brake 210 includes a skewed-roller brake disc 212 and a compression ratchet plate 214. The compression ratchet plate 214, like the compression ratchet plate 114 defines a plurality of recesses configured to matingly receive a pawl 216 pivotably mounted to the chassis (not shown in FIG. 4). With such an arrangement, the compression ratchet plate 214 is substantially free to rotate in a direction opposite to the compression aiding direction as the pawl drags along the outer circumference of the compression ratchet plate.

Similarly, the tension no-back brake 220 includes a skewed-roller brake disc 222 and a tension ratchet plate 224. The tension ratchet plate 224, like the tension ratchet plate 214 defines a plurality of recesses configured to matingly receive a pawl 226 pivotably mounted to the chassis (not shown in FIG. 4). With such an arrangement, the tension ratchet plate 224 is substantially free to rotate in a direction opposite to the tension aiding direction as the pawl drags along the outer circumference of the tension ratchet plate.

The no-back brakes 210, 220 shown in FIG. 4 also include several components omitted from the schematic illustration of the actuator 100. For example, the no-back brakes 210, 220 shown in FIG. 4 includes a distal friction plate 211 mounted to the distal face 208a of the flange 208 and a proximal friction plate 221 mounted to the proximal face 208b of the flange 208. The friction plates 211, 221 can provide the flange 208 with wear surfaces between the flange and the respective skewed-roller brake discs 212, 222 (or other friction plates between the flange and the respective ratchet plates 214, 224). Providing the flange 208 with friction plates 211, 221 provide a bearing surface that is easier to grind than the flange of the big ball screw. Further, the friction plates 211, 221 can inhibit deflection of the bearing surface under load, which otherwise would tend to change the contact pattern of the rollers on the plate (e.g., reduce the mean contact radius).

Further, the no-back brake 210 shown in FIG. 4 also includes a compression thrust plate 217 positioned between the distal thrust face of the chassis (not shown in FIG. 4) and the compression thrust bearing 218. Similarly, the no-back brake 220 shown in FIG. 4 also includes a tension thrust plate 227 positioned between the proximal thrust face of the chassis (not shown in FIG. 4) and the tension thrust bearing 228. Similar to thrust bearings 118, 128, the thrust bearings 218, 228 are configured to ensure the compression ratchet plate 214 and the tension ratchet plate 224, respectively, can rotate with low torsional friction opposite to their respective aiding directions. To provide a selected lower-threshold compressive load to the compression no-back brake 210 and to the tension no-back brake 220, respective distal and proximal pre-load springs 215, 225 can be positioned between the distal thrust-face of the chassis (not shown) and the distal thrust plate 217, and between the proximal thrust-face of the chassis (not shown) and the proximal thrust plate 227 respectively.

In some embodiments, the pre-load springs 215, 225 are embodied as Belleville washers. A Belleville washer (sometimes also referred to in the art as a disk spring) is an annular washer having an inner-most circumference and an outer-most circumference longitudinally offset from each other to yield a generally annular washer having a frustoconical shape. They can be used individually as a single spring or as a plurality in combination with each other in a stacked arrangement. Although the pre-load springs, in principle, can be embodied by a wide variety of resiliently deformable members without departing from the principles herein, Belleville washers offer a number of advantages that makes them particularly well-suited as pre-load springs in disclosed actuators. For example, they can apply large, concentric loads over relatively small longitudinal displacements, e.g., they can have high spring constants. Additionally, they can undergo a large number of loading and unloading cycles (provided that internal stresses remain below the materials fatigue limit).

Similar to the no-back brakes shown and described in relation to FIGS. 1 to 3, the no-back brakes 210, 220 can impart torsional drag to the actuator shaft 202. For example, as the compression ratchet plate 214 tends to rotate in the compression aiding direction, the pawl 216 catches in a recess defined by the ratchet plate 214 and engages the outer circumference of the ratchet plate 214. As the pawl 216 engages the outer circumference of the compression ratchet plate 214, the pawl prevents the compression ratchet plate 214 from rotating in the compression aiding direction. With the compression ratchet plate 214 being stationary when the shaft 202 is urged longitudinally in compression and to rotate in the compression aiding direction, the first skewed-roller brake disc 212 inhibits rotation by virtue of the skewed rollers within the brake disc 212. That is to say, although the skewed rollers 212a are free to rotate within the brake disc 212, the rollers are mounted such that their longitudinal axes are skewed, i.e., not oriented radially. Thus, as the flange 208 and friction plate 211 urges in rotation about the shaft's longitudinal axis, the rollers 212a impart torsional drag to the friction plate 211 (and thus the flange 208) in correspondence to a skew angle of rollers 212a within the disc 212 and a coefficient of friction between the rollers 212a and the friction plate 211. That is to say, the friction plate 211 must slide along an outer surface of the skewed rollers 212a for the shaft 202 to rotate.

Although the actuator and no-back brakes described above incorporate a rotatable ball-screw and a translatable ball-nut, other actuator embodiments are possible and come within the present disclosure. For example, some other actuator embodiments fixedly secure a threaded shaft (analogous to the shafts 102, 202) to the chassis 106 (save for limited, stress-induced deformation), while urging the nut (analogous to the nut 104) to rotate. In such embodiments, rotation of the nut causes the nut to translate longitudinally along the threaded portion of the shaft. As in the embodiment shown in FIG. 1, the nut can be coupled with a movable vehicle component to induce movement to the vehicle component as the nut translates along the threaded shaft.

In still other embodiments, the nut (analogous to the nut 104) is pivotably mounted to the chassis 106 to allow the nut to rotate about the shaft's longitudinal axis but to otherwise inhibit or prevent longitudinal movement of the nut. In such embodiments, as the nut rotates, the shaft (analogous to the shafts 102, 202) can translate longitudinally relative to the nut-and-chassis assembly. Such a movable shaft can be coupled with a movable vehicle component so movement of the shaft induces movement of the movable vehicle component. And, in still other embodiments, the nut can be fixedly secured to the chassis 106 and the shaft can be rotatable and translatable relative to the nut. In such embodiments, as the shaft rotates, the threaded engagement of the shaft with the fixedly secured nut induces longitudinal movement of the shaft relative to the chassis. The movable shaft can be coupled with a movable vehicle component so movement of the shaft induces movement of the movable vehicle component.

Each of the alternative actuator embodiments just described can include a compression no-back brake, a tension no-back brake, or both, to induce torsional drag that counters a back-fed load. For example, each no-back brake can have a friction interface configured to impart the torsional drag in correspondence with a threshold longitudinal load applied to the friction interface by the shaft, the nut, or both.

III. Integrity Monitors for No-Back Brakes

Some actuator embodiments as just described also include a load adjuster to selectively apply a longitudinal load to one or more friction interfaces, absent an external load (e.g., a load resulting from aerodynamic forces acting on a control surface to which the actuator is coupled). In some embodiments, the load adjuster can apply a compressive force to one or more friction interfaces that mimics a longitudinal load applied by a shaft under tension or compression (or both). Such a load adjuster can be particularly useful for assessing integrity of a no-back brake assembly when a flight vehicle is at-rest, e.g., during a ground inspection of the air vehicle.

FIG. 5 schematically illustrates an actuator 300 having a no-back assembly 301 and a manual load adjuster 330 configured to manually engage the no-back assembly. By manually engaging the no-back assembly 302, integrity of the no-back assembly can be assessed while a vehicle in which the actuator is mounted is out of service. As described above, the actuator 300 has a ball-screw 302 with a flange 308, as well as a compression no-back brake 310 and a tension no-back brake 320, generally as described above. However, the actuator 300 also includes a load adjuster 330 configured to selectively load and unload one or both of the no-back brakes 310, 320.

More particularly, the illustrated load adjuster 330 can define an external thread (not shown) that matingly engages with a complementary internal thread (not shown) defined by a longitudinal bore 340 in the chassis 306. A proximal face 332 of the load adjuster 330 urges against the pre-load spring 315, which as described above in connection with the pre-load spring 215, provides a threshold compressive load to the no-back brakes 310, 320 when the actuator is in service. The load adjuster 330 also defines an externally accessible feature 334 (e.g., a boss defining a hexagonal head of a standard size suitable for engaging with an open ended wrench, a box wrench, or a socket wrench; one or more keyed recesses having an internal wall structure suitable for engaging with, for example, an Allen wrench, a Torx-head wrench, a spanner wrench) configured to permit a user to apply a torque to the load adjuster and threadedly advance the proximal face 332 toward the no-back brake assemblies 310, 320. Such a load adjuster is sometimes referred to herein as a "thrust nut," though other embodiments of longitudinally movable load adjusters, which urge against another component as described elsewhere herein, also are sometimes referred to herein as a "thrust nut."

As the proximal face 332 of the load adjuster 330 advances toward the no-back brake assemblies 310, 320, the pre-load spring 315 can deform by a corresponding longitudinal displacement. Such longitudinal displacement of the pre-load spring 315 can apply a predetermined longitudinal load to the compression no-back brake 310. For example, the predetermined longitudinal load can correspond to (e.g., in some embodiments, is proportional to) the longitudinal displacement. For example, with a linear correlation between longitudinal displacement and longitudinal load, a spring constant (e.g., slope of the load/displacement correlation) multiplied by the longitudinal displacement can yield a predicted longitudinal load transmitted by the spring. That being said, whether the load-displacement correlation is linear or non-linear is unimportant, so long as the correlation is known and repeatable. For example, so long as the load and displacement is known for an in-flight position (e.g., unloaded or only nominally loaded) and for a test-position, then the torque for a healthy no-back mechanism can be determined for each position. For example, with a known thread pitch of the threaded engagement between the load adjuster 330 and the complementary internal thread of the longitudinal bore 303 in the chassis 306, a measure of angular rotation of the externally accessible feature 334 can be correlated with a measure of longitudinal displacement of the proximal face 332 of the load adjuster 330, and thus longitudinal displacement of the pre-load spring 315. Further, as noted above, longitudinal displacement of the pre-load spring 315 can correlate to the longitudinal load transferred by the pre-load spring, e.g., to the compression no-back brake assembly 310.

Referring still to FIG. 5, an externally visible surface of the load adjuster 330 can define a visible indicia of position 336. Similarly, an externally visible surface of the chassis 306 can define a corresponding indicia of position 307. When the indicia 336 of the load adjuster 330 aligns with the indicia 307 of the chassis, the load adjuster can be in a defined reference position relative to one or more of the chassis 306, the no-back brake assemblies 310, 320, and the flange 308, as depicted for example in FIG. 5. In the reference position, the load adjuster 330 can apply a predetermined load, or no load, to the pre-load spring 315. For example, the reference position may be an in-service position (as in FIG. 5), whereby the pre-load spring applies an in-service compressive force to the no-back brakes (e.g., within a suitable or intended range of compressive loads). In such an embodiment, rotation of the load adjuster through a predetermined angular displacement (e.g., as depicted schematically in FIG. 6) can advance the load adjuster 330 through a suitable longitudinal displacement to sufficiently compress the pre-load spring 315 that it applies a compressive load to the no-back brake 310 that is equivalent in magnitude to an in-service load. In another embodiment, the reference position may be a test position, e.g., a position selected to sufficiently compress the pre-load spring 315 that it applies a compressive load to the no-back brake 310 that is equivalent in magnitude to a back-fed, compressive load applied to the no-back brake 310 when aerodynamic forces act on a control surface. In such an embodiment, the load adjuster can be rotated through a suitable angular displacement to back the load adjuster away from the no-back assembly, thereby releasing compressive force applied by the pre-load spring.

In other embodiments, the externally visible surface of the chassis defines a first indicia of position 307 corresponding to an in-service position of the load adjuster 330 (e.g., as in FIG. 5), whereby the pre-load spring 315 applies an in-service compressive force to the no-back brakes (e.g., within a suitable or intended range of compressive loads). In such embodiments, the externally visible surface of the chassis can define a second indicia of position 307' corresponding to an integrity-test position of the load adjuster, wherein the pre-load spring 315 applies a compressive load to the no-back brake 310 that is equivalent to an in-service load imposed on the actuator by a control surface under aerodynamic loading.

When such a longitudinal load is applied to, for example, the compression no-back brake assembly 310, the compression no-back brake assembly can impart torsional drag to the actuator shaft 302 counter to rotation in the compression aiding direction. By selectively advancing the load adjuster (or thrust nut) through a suitable longitudinal displacement, the longitudinal load applied to the compression no-back brake assembly 310 by the pre-load spring 315 can approximate a longitudinally compressive load applied to the compression no-back brake assembly 310 that otherwise arises from in-service aerodynamic loading of a control surface coupled with the actuator. Accordingly, advancing the load adjuster 330 by a predetermined displacement, the compression no-back brake assembly 310 can be loaded while the actuator is out of service (e.g., during a ground inspection of an air vehicle) with loads equivalent to a selected in-service (e.g., flight) condition.

Further, the torque that must be applied to the shaft 302 to overcome the torsional drag imparted by the compression no-back brake assembly 310 (when loaded by the load adjuster 330) can be measured and compared to a threshold torque (e.g., an expected torque, for example, based on a design-torque value under a compressive, back-fed load). If the measured torque to overcome the torsional drag imparted by the compression no-back brake assembly 310 falls below a lower threshold torque (e.g., an expected torque, or a minimum safe torque, corresponding to a given longitudinal compressive load), it can be surmised that the compression no-back brake assembly 310 has worn beyond a design limit or has otherwise lost its intended braking ability. Accordingly, such a torque measurement can provide a useful indication of the compression no-back brake's function or operational integrity.

Further, such torque measurements can be made by manually loading the compression no-back brake assembly 310 with the load adjuster 330 while the actuator 300 is out of service, e.g., during a ground inspection of an air vehicle. Accordingly, such load adjusters and actuators that incorporate them can be particularly suitable for applications where the functional or operational integrity of the no-back brake is critical, e.g., in passenger aircraft applications. After assessing integrity of the no-back brake assembly, the thrust nut can be longitudinally withdrawn from longitudinal position that loads the no-back brake assemblies to another, e.g., in-service, longitudinal position that allows the pre-load spring to resiliently recover its service configuration from its compressed, testing configuration. In many embodiments, the pre-load spring imparts a lower longitudinal load to the no-back brake assemblies 310, 320 in the in-service configuration compared to its compressed, testing configuration.

Although the immediately foregoing description of compressive loading by the load adjuster 330 proceeded in context of engaging the compression no-back brake assembly 310, such compression loading by the load adjuster also engages the tension no-back brake assembly 320 in actuator configurations as shown in FIGS. 5 and 6. That is to say, the longitudinal load applied to the compression no-back brake assembly 310 in FIG. 6 is countered by the proximal face 309 of the chassis (assuming the shaft 302 is not otherwise longitudinally supported). And, similar to the compression no-back brake, the tension no-back brake assembly 320 can be engaged by such a compressive force applied between the flange 308 of the actuator shaft 302 and the proximal wall 309 of the chassis.

Accordingly, the torque that must be applied to the shaft 302 to overcome the torsional drag imparted by the tension no-back brake assembly 320 can be measured and compared to a threshold torque (e.g., an expected torque, for example, based on a design-torque value). If the measured torque to overcome the torsional drag imparted by the tension no-back brake assembly 320 when loaded in compression by the load adjuster 330 falls below a lower threshold torque (e.g., an expected torque, or a minimum safe torque, corresponding to a given longitudinal compressive load), it can be surmised that the tension no-back brake assembly 320 has worn beyond a design limit or has otherwise lost its intended braking ability. Accordingly, such a torque measurement can provide a useful indication of the tension no-back brake's function or operational integrity.

In simple terms, with the load adjuster in the test position, both compression and tension no-backs can be checked by rotating the screw clockwise and counterclockwise. Also, in some embodiments, it may be practical to rotate the screw indirectly, e.g., by rotating a manual drive on the motor that is mechanically coupled to the screw through one or more gears (e.g., gear reduction). In such embodiments, the torque applied by the technician, e.g., to the motor, would be lower than the torque needed to turn the screw, and thus would be easier to apply.

FIGS. 7, 7A, 8 and 8A show another embodiment of an actuator 400 having bi-directional no-back brakes 410, 420 (analogous to the no-back brakes 310, 320) with a longitudinally movable load adjuster 430 for manually loading the no-back brakes when the actuator is free of external (e.g., aerodynamic) loading. The no-back brake assemblies 410, 420 can be positioned within a lubricant-filled chamber 409.

The actuator 400 has a pre-load spring 415 that urges the no-back brake assemblies 410, 420 in compression, similar to the pre-load spring 315, described above. With such arrangements, the no-back stack can be preloaded, e.g., to stabilize the assembly under vibrations common during flight or other vehicle operation. Nevertheless, the pre-load is sufficiently low that the no-back brakes are not engaged, or are only lightly engaged, absent external loading by a back-fed load. In some embodiments, a small gap (not labeled) exists between the thrust plate 441 and the no-back assembly 410, e.g., to accommodate differential thermal expansion and contraction. The pre-load spring 415 ensures that, despite such a gap, the no-back stack remains under at least a lower threshold compressive load to ensure the no-back stack of components remain in contact.

Figure 7:
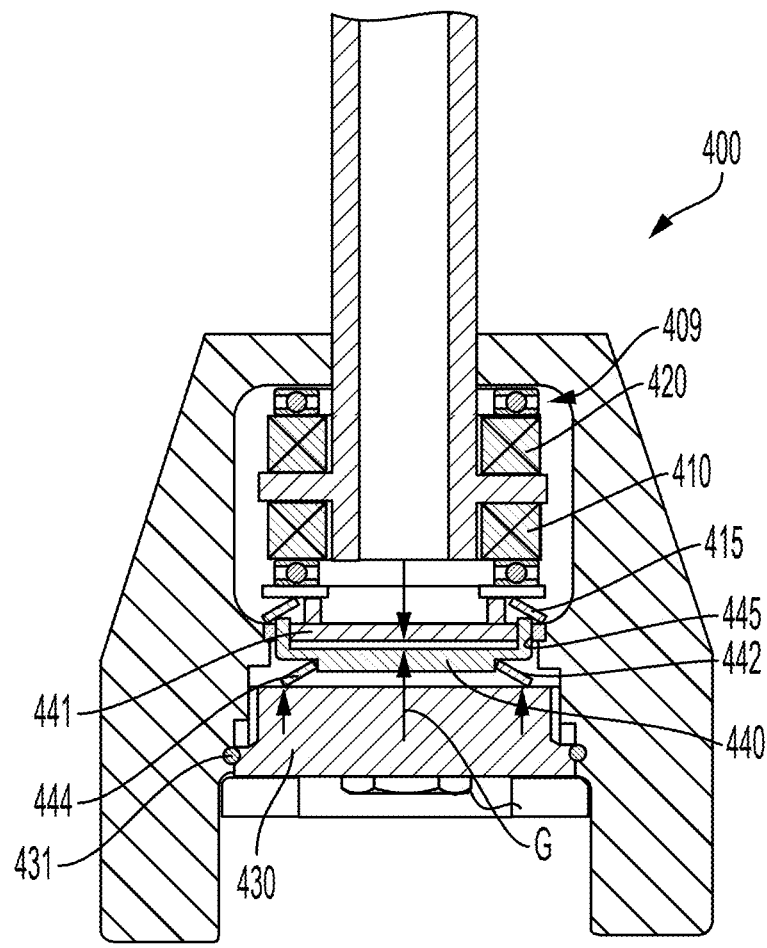
FIG. 7 schematically illustrates a cross-sectional view of a linear actuator having a no-back brake and a load adjuster.
Figure 7A:
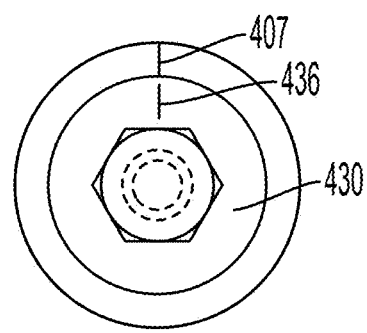
FIG. 7A shows an end-elevation view of the load adjuster oriented as in FIG. 7.
Figure 8:
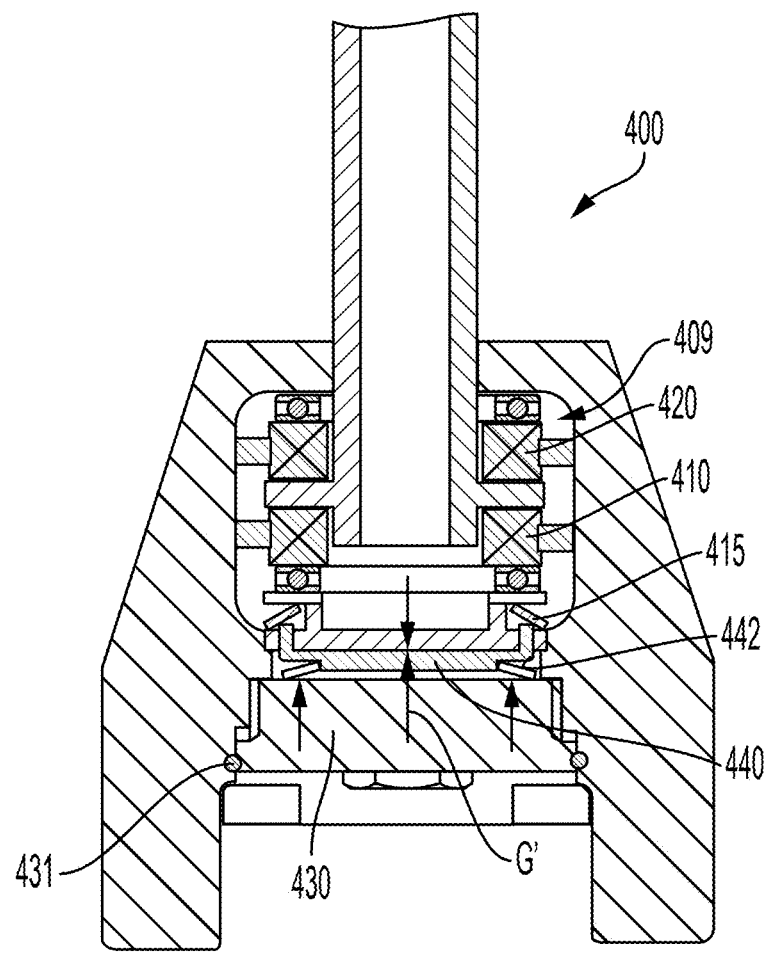
FIG. 8 schematically illustrates a cross-sectional view of the linear actuator shown in FIG. 7 with the load adjuster applying a compressive load to the no-back brake.
Figure 8A:
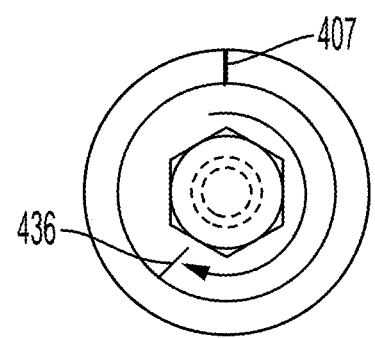
FIG. 8A shows an end-elevation view of the load adjuster oriented as in FIG. 8.

However, unlike the actuator 300 in which the longitudinally movable load adjuster 330 urges directly against the pre-load spring 315 to load and unload the no-back brake assemblies 310, 320, the actuator 430 shown in FIGS. 7 and 8 has an intermediate, movable thrust washer (or thrust plate) 440 positioned between the longitudinally movable load adjuster 430 and the pre-load spring 415 that urges against the no-back brake assemblies 410, 420.

Figure 9:
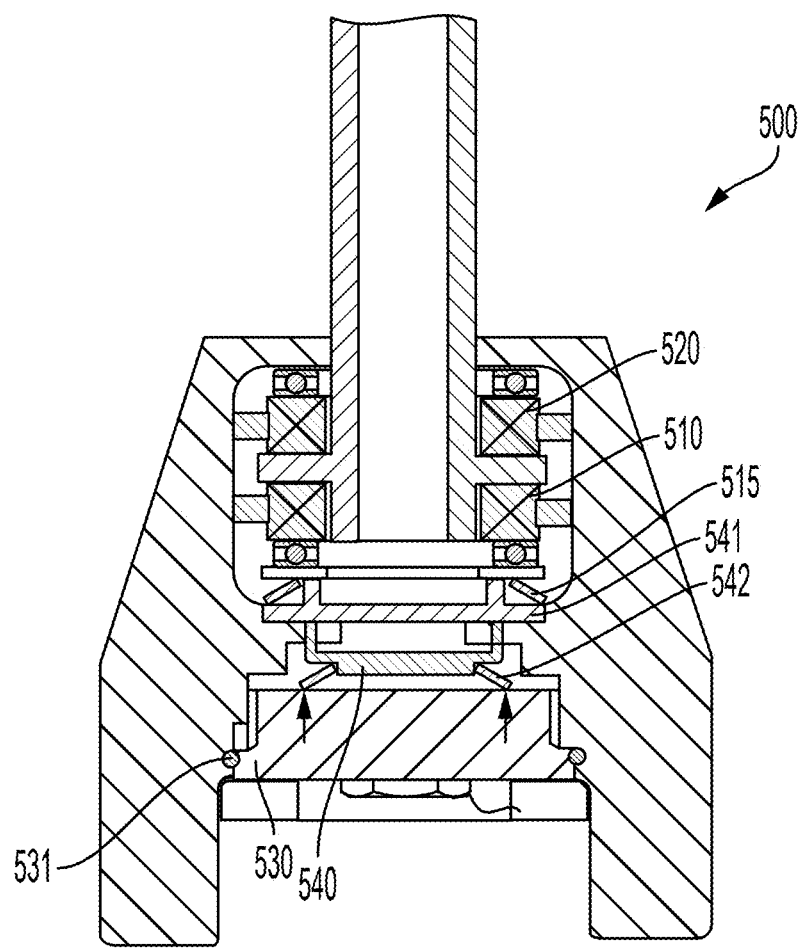
FIG. 9 schematically illustrates a cross-sectional view of a linear actuator having a no-back brake and a load adjuster.
Figure 9A:
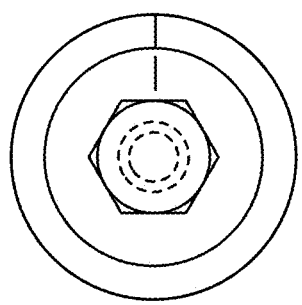
FIG. 9A shows an end-elevation view of the load adjuster oriented as in FIG. 9.
Figure 10:
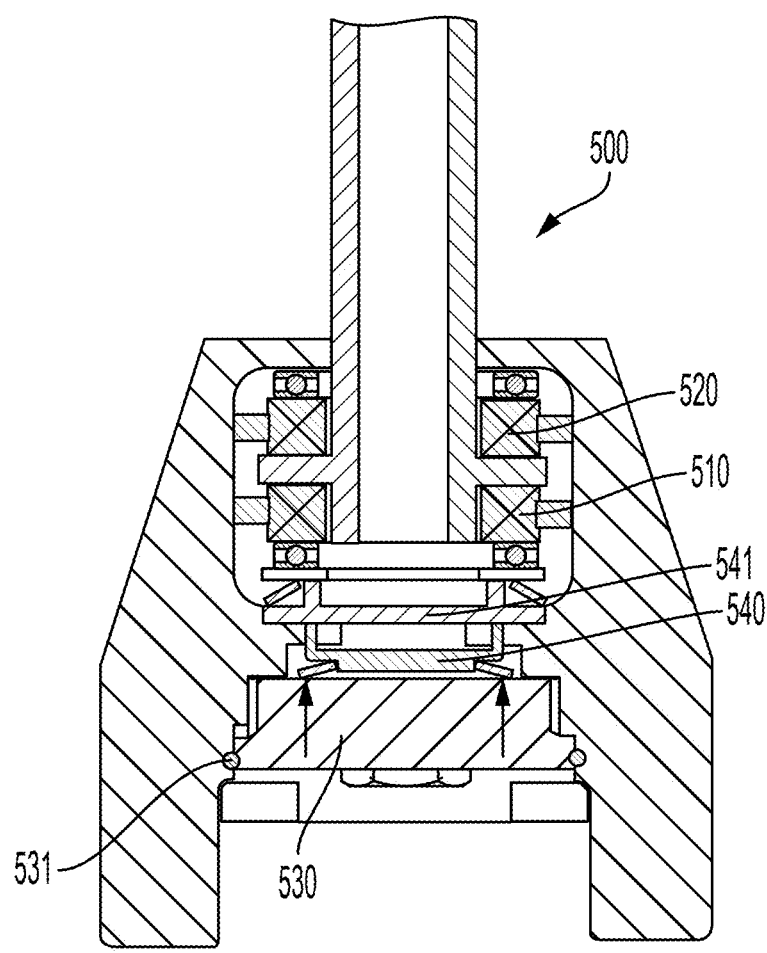
FIG. 10 schematically illustrates a cross-sectional view of the linear actuator shown in FIG. 5 with the load adjuster applying a compressive load to the no-back brake.
Figure 10A:
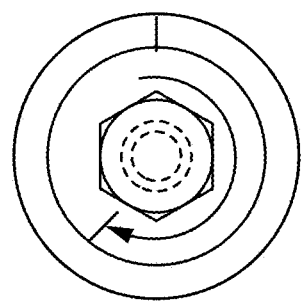
FIG. 10A shows an end-elevation view of the load adjuster oriented as in FIG. 10.

For example, the movable thrust washer 440 can define one or more longitudinally extending features, e.g., pins, 445, that extend through a chassis wall 441 and urge against the pre-load spring 415. The one or more longitudinally extending features 445 can urge against the pre-load spring 415 to load and unload the no-back brake assemblies 410, 420. The movable thrust washer 440 can define an annular seat 442 positioned in opposed relationship to the longitudinally movable load adjuster 430. A Belleville washer 444 or other resiliently deformable spring element can be positioned between the longitudinally movable load adjuster 430 and the annular seat such that the longitudinally movable load adjuster 430 can load and unload the movable thrust washer 440 via the intermediate Belleville washer 444 or other resiliently deformable spring element as the longitudinally movable load adjuster 430 moves longitudinally to-and-fro. The load adjuster 430, Belleville washer 442 and movable thrust washer 440 apply an external load to the no-back assemblies 410, 420 above and beyond the pre-load under normal operating conditions. An arrangement where pins or other features urge directly against the pre-load spring 415 may be inferior to an arrangement, e.g., as shown in FIGS. 9 and 10, in which the movable thrust washer 440 urges against an intermediate plate, which in turn compresses the pre-load spring 415, as pins or other discrete features impose point loads to the pre-load spring, making the circumferential load non-uniform. By contrast, a plate or other component that urges continuously around the circumference of the pre-load spring avoids concentrating loads at discrete locations on the circumference and instead distributes the load more evenly around the circumference. Moreover, external, longitudinally extending features, e.g., pins, 445, that extend through a chassis wall 441 for loading the no-back assemblies can also be withdrawn (e.g., as in FIG. 7) to remove the external load applied by the integrity monitor.

The chassis wall 441, in turn, can define an outer extent of the lubricant-filled chamber 409. To inhibit leakage or seepage of the lubricant from the chamber, the chassis wall 441 can sealingly engage with an outer surface of the one or more longitudinally extending features 442 as they move longitudinally (e.g., translate) to-and-fro through the chassis wall 441 to load and unload the no-back brake assemblies 410, 420. In some embodiments, the load adjuster 330, 430, 530 has an O-ring 331, 431, 531 or other sealing member extending circumferentially around the load adjuster to prevent or inhibit leakage or seepage of a lubricant around the load adjuster.

As FIGS. 7 and 8 show, when the longitudinally movable load adjuster 430 is in a service position, a portion of the movable thrust washer 440 can be longitudinally spaced apart from the chassis wall 441 to define a gap G therebetween. As the longitudinally movable load adjuster 430 urges longitudinally to load the no-back brake assemblies 410, 420, the gap G can close, G', as shown in FIG. 8. Accordingly, the chassis-wall 441 can act as a mechanical stop to prevent the movable thrust washer 440 from over- or under-loading the pre-load spring 415.

As with the embodiment shown in FIGS. 5, 5A, 6, 6A, the actuator 400 in FIGS. 7, 7A, 8, 8A can include externally visible indicia 407, 436 of the longitudinally movable load adjuster's position.

FIGS. 9, 9A, 10, 10A show yet another embodiment of an actuator 500 having bi-directional no-back brakes 510, 520 with a longitudinally movable load adjuster 520 for manually loading the no-back brakes when the actuator is free of external (e.g., aerodynamic) loading. Like the embodiments 300, 400 shown in FIGS. 5, 5A, 6, 6A, 7, 7A, 8, 8A, the no-back brake assemblies 510, 520 shown in FIGS. 9 and 10 can be positioned within a lubricant-filled chamber. And, like the embodiment 400, the actuator 500 incorporates a longitudinally movable thrust washer 540 positioned between the load adjuster 530 and the no-back brake assemblies 510, 520. However, unlike the movable thrust washer 440 of the actuator 400, the movable thrust washer 540 does not penetrate an outer wall of the lubricant-filled chamber to engage the no-back brake assemblies 510, 520. Rather, the movable thrust washer 540 urges against a longitudinally movable piston 541 that engages the no-back brake assemblies 510, 520 by urging the pre-load spring 515 into further compression. With an embodiment as in FIGS. 8 and 9, the load adjuster 530 longitudinally loads and unloads the movable thrust washer 540 via an intermediate, resiliently deformable spring element 542 (e.g., a Belleville spring). In correspondence therewith, the movable thrust washer 540 longitudinally loads and unloads longitudinally movable piston 541, which, in turn, loads and unloads the no-back brake assemblies 510, 520, generally as described above, for integrity monitoring and normal operation, respectively.

In each of the foregoing embodiments, a single load adjuster can be configured to manually engage both the tension no-back brake and the compression no-back brake, which can allow integrity of the tension no-back brake and the compression no-back brake to be observed while the actuator is out-of-service. This is a notable feature of presently disclosed integrity monitoring configurations and actuators that incorporate them.

IV. Other Embodiments

The previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art. For example, although principles relating to no-back assemblies are described above in connection with actuator embodiments having bi-directional no-back brakes (e.g., to resist rotation when the shaft is in compression and in tension), actuator embodiments having a single direction no-back brake (e.g., to resist rotation when the shaft is in compression or in tension) are contemplated by this disclosure. Such embodiments are suitable, for example, when a control surface should remain engaged in one direction but can be moved in the opposite direction without risk of harm. For example, a spoiler actuator may be configured to prevent up-float but allow blow-down.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of actuators and integrity monitors therefor. For example, the principles described above in connection with any particular feature can be combined with the principles described in connection with another feature described herein. Further, all structural and functional equivalents to the features and method acts of the various embodiments described throughout the disclosure that are known or later come to be known to those of ordinary skill in the art are intended to be encompassed by the principles described and the features and acts claimed herein, or at any time during prosecution of this or a continuing patent application. Accordingly, neither the appended claims nor this detailed description shall be construed in a limiting sense, and following a review of this disclosure, those of ordinary skill in the art will appreciate the wide variety of actuators and integrity monitors that can be devised using the various concepts described herein.

Moreover, nothing disclosed herein is intended to be dedicated to the public regardless of whether such disclosure is explicitly recited in the claims. No claim feature is to be construed under the provisions of 35 USC 112 (f), unless the feature is expressly recited using the phrase "means for" or "step for".

The appended claims are not intended to be limited to the embodiments shown herein, but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, we reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

We claim:

1. A linear actuator, comprising:
   a shaft defining a longitudinal axis and a first threaded portion;
   a nut defining a second threaded portion, wherein the first threaded portion and the second threaded portion are so complementary with each other as to be threadedly engageable with each other, wherein, when the shaft and the nut are threadedly engaged with each other, rotation of the shaft or the nut imparts translative movement of the shaft and the nut relative to each other along the longitudinal axis;
   a no-back brake having a friction interface configured to impart a selected torsional drag counter to said rotation when a threshold longitudinal load is applied to the friction interface by the shaft or the nut, or both; and
   a movable load adjuster configured to selectively apply a longitudinal load to the friction interface that simulates the threshold longitudinal load applied to the friction interface by the shaft or the nut, or both.

2. The linear actuator according to claim 1, wherein the friction interface comprises a friction disc, a skewed-roller brake disc, or both, configured to impart the torsional drag counter to said rotation.

3. The linear actuator according to claim 1, wherein the longitudinally movable load adjuster comprises a longitudinally movable thrust nut and a deflectable spring, the deflectable spring having a service configuration and a loaded configuration, wherein, in the loaded configuration, the deflectable spring engages the friction interface to impart torsional drag counter to said rotation.

4. The linear actuator according to claim 3, wherein the thrust nut is longitudinally movable from a first longitudinal position to a second longitudinal position, wherein movement of the thrust nut from the first longitudinal position to the second longitudinal position urges the deflectable spring to deform from its service configuration to its loaded configuration, wherein the friction interface comprises a friction element and wherein, in the loaded configuration, the deflectable spring engages the friction element, wherein said engaged friction element imparts said torsional drag to the shaft or to the nut, or to both.

5. The linear actuator according to claim 4, wherein movement of the thrust nut from the second longitudinal position to the first longitudinal position allows the deflectable spring to resiliently recover its service configuration from its loaded configuration, wherein, in its service configuration, the deflectable spring imparts less than the threshold longitudinal load to the friction interface.

6. The linear actuator according to claim 1, wherein the threshold longitudinal load is a threshold compressive load applied to the shaft.

7. The linear actuator according to claim 6, wherein the torsional drag counter to said rotation is a torsional drag counter to rotation in a first direction, and wherein the no-back brake is configured to reduce or to release the torsional drag counter to rotation in the first direction when a threshold tensile load is applied to the shaft.

8. The linear actuator according to claim 1, wherein the friction interface is a first friction interface configured to impart a first torsional drag counter to said rotation in a first direction when a threshold longitudinal load is applied to the shaft or the nut, or both, in a first longitudinal direction, the linear actuator further comprising a second friction interface configured to impart a second torsional drag counter to rotation in a second direction opposite the first direction when a threshold longitudinal load is applied to the shaft or the nut, or both, in a second longitudinal direction opposite the first longitudinal direction.

9. The linear actuator according to claim 8, wherein the first friction interface is configured to impart the first torsional drag counter to rotation in the first direction when a threshold compressive load is applied to the shaft, and wherein the second friction interface is configured to impart the second torsional drag counter to rotation in the second direction when a threshold tensile load is applied to the shaft.

10. The linear actuator according to claim 8, wherein the longitudinally movable load adjuster is configured to engage the first friction interface to impart the first torsional drag, to engage the second friction interface to impart the second torsional drag, or both.

11. A vehicle, comprising:
a chassis and a vehicle component movably coupled with the chassis;
a rotatable actuator member defining a longitudinal axis, the rotatable actuator member so coupled with the chassis and the vehicle component that the vehicle component moves relative to the chassis in correspondence with rotation of the rotatable actuator member;
a brake configured to inhibit the rotatable actuator member from rotating under forces back-fed to the rotatable actuator through the vehicle component during operation of the vehicle; and
an integrity monitor for the brake having a movable threaded member, the movable threaded member configured to selectively apply a threshold load to the brake in correspondence with movement of the threaded member along the longitudinal axis, wherein the threshold load engages the brake to inhibit the rotatable actuator member from rotating.

12. The vehicle according to claim 11, wherein the rotatable actuator member is a ball-screw, wherein the brake comprises a friction interface configured to impart a torsional drag to the ball screw when forces applied by the vehicle component during operation of the vehicle urge the ball screw in compression or tension, or both.

13. The vehicle according to claim 11, wherein the friction interface configured to impart a torsional drag to the ball screw when forces applied by the vehicle component during operation of the vehicle urge the ball screw in compression or tension, or both, is a first friction interface configured to impart a torsional drag to the ball screw when forces applied by the vehicle component during operation of the vehicle urge the ball screw in compression, wherein the brake comprises a second friction interface configured to impart a second torsional drag to the ball screw when forces applied by the vehicle component during operation of the vehicle urge the ball screw in tension.

14. The vehicle according to claim 13, wherein the threaded member is configured to selectively apply the threshold load to the first friction interface, the second friction interface, or both.

15. The vehicle according to claim 14, wherein the movable threaded member is manually adjustable.

16. The vehicle according to claim 11, wherein the integrity monitor comprises a resiliently compressible spring that, when compressed to a threshold measure, applies the threshold load to the brake, and wherein the movable threaded member is configured to compress the resiliently compressible spring to the threshold measure.

17. A method of checking integrity of a no-back brake for a flight-control actuator, wherein the flight-control actuator has a rotatable member defining a longitudinal axis and the no-back brake applies torsional drag to counter rotation of the rotatable member when a force is applied to the rotatable member along the longitudinal axis, the method comprising:
applying a longitudinally directed threshold force to the no-back brake with an adjustable integrity monitor;
applying a selected threshold torque to the rotatable member; and
determining a condition of the no-back brake in correspondence with whether the rotatable member rotates under the selected threshold torque.

18. The method according to claim 17, wherein the act of applying a selected threshold torque to the rotatable member comprises urging an input shaft in rotation, wherein the input shaft and the rotatable member are so coupled with each other through a gearing that a torque applied to the input shaft applies an increased torque to the rotatable member of the flight-control actuator.

19. The method according to claim 17, wherein the act of applying the selected torque to the rotatable member comprises activating an electric motor configured to urge the rotatable member into rotation.

20. The method according to claim 18, wherein the adjustable integrity monitor is manually adjustable from an in-flight service position to a maintenance position with a hand tool.

21. The linear actuator according to claim 1, wherein the movable load adjuster is manually adjustable.

22. The vehicle according to claim 15, wherein the movable load adjuster is manually adjustable with a hand tool.

23. The method according to claim 17, wherein the act of applying a longitudinally directed threshold force to the no-back brake with an adjustable integrity monitor comprises manually adjusting the adjustable integrity monitor from an in-flight service position to a maintenance position with a hand tool.

* * * * *